(12) United States Patent
Dudar et al.

(10) Patent No.: US 10,272,807 B2
(45) Date of Patent: Apr. 30, 2019

(54) EFFICIENT CONTROL OF TEMPERATURE ALTERING SYSTEMS WITHIN A VEHICLE SEATING ASSEMBLY

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/584,417

(22) Filed: May 2, 2017

(65) Prior Publication Data
US 2018/0319299 A1 Nov. 8, 2018

(51) Int. Cl.
| G06F 7/00 | (2006.01) |
| B60N 2/56 | (2006.01) |
| B60H 1/00 | (2006.01) |
| B60K 35/00 | (2006.01) |

(52) U.S. Cl.
CPC ....... *B60N 2/5685* (2013.01); *B60H 1/00742* (2013.01); *B60K 35/00* (2013.01); *B60N 2/5692* (2013.01); *B60K 2350/90* (2013.01)

(58) Field of Classification Search
CPC .............. B60N 2/5685; B60N 2/5692; B60H 1/00742; B60H 1/00985
USPC ...................... 701/36, 23; 297/180.1, 180.15
See application file for complete search history.

(56) References Cited

U.S. PATENT DOCUMENTS

| 6,079,485 | A | 6/2000 | Esaki et al. |
| 6,164,719 | A | 12/2000 | Rauh |
| 6,255,790 | B1 | 7/2001 | Popp et al. |
| 6,541,737 | B1 | 4/2003 | Eksin et al. |
| 6,676,207 | B2 | 1/2004 | Rauh et al. |
| 6,722,148 | B2 | 4/2004 | Aoki et al. |
| 6,906,293 | B2 | 6/2005 | Schmiz et al. |
| 6,920,234 | B1 | 7/2005 | Koenig et al. |
| 7,255,161 | B2 | 8/2007 | Durach et al. |
| 7,500,536 | B2 * | 3/2009 | Bulgajewski ............ H05B 3/34 177/136 |
| 2009/0229785 | A1 * | 9/2009 | Kadle .................. B60N 2/5628 165/42 |

(Continued)

*Primary Examiner* — Shardul D Patel
(74) *Attorney, Agent, or Firm* — Vichit Chea; Price Heneveld LLP

(57) ABSTRACT

A method of altering the temperature of an external surface of a seating assembly for a vehicle comprising: providing a seating assembly for a vehicle comprising an external surface and multiple temperature altering systems disposed beneath the external surface; presenting an object on the external surface; determining which of the multiple temperature altering systems to activate as a function of the size of the object and the position of the object on the seating assembly, such that, the larger the size, the more of the multiple temperature altering systems are activated, and such that, if the object is not positioned in thermal communication with one or more of the multiple temperature altering systems, then those temperature altering systems are not activated; and activating only the temperature altering systems that the method determined to activate as a function of the size and the position of the object on the seating assembly.

19 Claims, 9 Drawing Sheets

(56) References Cited

U.S. PATENT DOCUMENTS

| | | | |
|---|---|---|---|
| 2009/0250980 A1* | 10/2009 | Major | B60N 2/5635 297/180.15 |
| 2012/0274104 A1* | 11/2012 | Nishikawa | B60N 2/5685 297/180.1 |
| 2013/0271074 A1* | 10/2013 | Federico | G06F 7/00 320/109 |
| 2015/0239379 A1* | 8/2015 | Yoshida | B60N 2/5685 297/180.12 |
| 2015/0339928 A1* | 11/2015 | Ramanujam | G08G 1/202 701/23 |
| 2016/0236598 A1* | 8/2016 | Hoshi | B60N 2/5657 |
| 2016/0304013 A1* | 10/2016 | Wolas | B60N 2/5628 |
| 2016/0325655 A1* | 11/2016 | Joshi | B60H 1/00285 |
| 2016/0347217 A1* | 12/2016 | Nishimura | B60N 2/5635 |
| 2017/0210259 A1* | 7/2017 | Iwata | B60N 2/002 |
| 2017/0349027 A1* | 12/2017 | Goldman-Shenhar | B60H 1/00742 |
| 2018/0065582 A1* | 3/2018 | Miller | B60R 21/01538 |

* cited by examiner

EFFICIENT CONTROL OF TEMPERATURE ALTERING SYSTEMS WITHIN A VEHICLE SEATING ASSEMBLY

FIELD OF THE INVENTION

The present invention generally relates to the control of temperature altering systems within a seating assembly of a vehicle to promote energy efficiency.

BACKGROUND OF THE INVENTION

A seating assembly present in a vehicle sometimes contains temperature altering systems, such as systems to increase temperature (heating devices) and systems to decrease temperature (cooling devices) of an object, such as a person, presented on the external surface of the seating assembly. Powering the temperature altering systems requires the use of energy.

SUMMARY OF THE INVENTION

According to a first aspect of the present invention, a seating assembly for a vehicle comprises: a seatback, a seat, and an external surface covering at least portions of both the seatback and the seat; multiple temperature altering systems disposed beneath the external surface within the seat; and multiple temperature altering systems disposed beneath the external surface within the seatback; wherein each of the multiple temperature altering systems are separately controllable via a controller.

Embodiments of the first aspect of the invention can include any one or a combination of the following features:
- a temperature measuring device below the external surface of the seat to measure the temperature of an object presented on the external surface of the seat, and one or more of the multiple temperature altering systems of the seat are configured to attempt to maintain the temperature of the object at the measured temperature;
- sensors disposed beneath the external surface that are used as part of an occupant classification system that detects whether a person is occupying the seating assembly and, if a person is occupying the seating assembly, categorizes the size of the person into a category;
- two or more of the multiple temperature altering systems are concentrically arranged below the external surface of the seat; and
- two or more of the multiple temperature altering systems are concentrically arranged below the external surface of the seatback.

According to a second aspect of the present invention, a vehicle comprises: a seating assembly comprising an external surface and multiple temperature altering systems disposed beneath the external surface; wherein each of the multiple temperature altering systems are separately controllable via a controller; and a controller in communication with the multiple temperature altering systems that separately controls each of the multiple temperature altering systems.

Embodiments of the second aspect of the invention can include any one or a combination of the following features:
- the seating assembly further comprising a temperature measuring device in communication with the controller, the temperature measuring device configured to measure the temperature of an object placed on the external surface of the seating assembly, and the controller causes one or more of the multiple temperature altering systems to maintain the object at the measured temperature;
- an occupant classification system that detects whether a person is occupying the seating assembly and, if a person is occupying the seating assembly, categorizes the size of the person into a category, and the controller determines which of the multiple temperature altering systems to activate as a function of the category of the size of the person categorized by the occupant classification system; and
- the seating assembly further comprising sensors in communication with the controller, and wherein the occupant classification system detects whether a person is occupying the seating assembly and, if a person is occupying the seating assembly, categorizes the size of the person into a category using the sensors.

According to a third aspect of the present invention, a method of altering the temperature of an external surface of a seating assembly for a vehicle comprises: providing a seating assembly for a vehicle comprising an external surface and multiple temperature altering systems disposed beneath the external surface; presenting an object having a size on the external surface of the seating assembly; determining which of the multiple temperature altering systems of the multiple temperature altering systems to activate as a function of the size of the object and the position of the object on the seating assembly, such that, the larger the size of the object, the more of the multiple temperature altering systems are activated, and such that, if the object is not positioned in thermal communication with one or more of the multiple temperature altering systems, then those temperature altering systems are not activated; and activating only the temperature altering systems of the multiple temperature altering systems that the method determined to activate as a function of the size of the object and the position of the object on the seating assembly.

Embodiments of the third aspect of the invention can include any one or a combination of the following features:
- providing a user interface that allows a user to select which of the multiple temperature altering systems to activate, and activating only the temperature altering systems of the multiple temperature altering systems that the method determined to activate as a function of the size of the object and the position of the object on the seating assembly comprises selecting, via the user interface, which of the temperature altering systems to activate;
- the user interface is provided within the vehicle;
- the user interface is a mobile computing device located outside of the vehicle;
- the object is a person; the vehicle comprises an occupant classification system that detects whether a person is occupying the seating assembly and, if a person is occupying the seating assembly, categorizes the size of the person into a category; and determining which of the multiple temperature altering systems of the multiple temperature altering systems to activate as a function of the size of the object and the position of the object on the seating assembly is based on the categorization of the size of the person as categorized by the occupant classification system;
- the seating assembly further comprises sensors, and the occupant classification system utilizes the sensors to detect whether a person is occupying the seating assembly and, if a person is occupying the seating assembly, to categorize the size of the person into a category;

the vehicle further comprises a camera, and the occupant classification system utilizes the camera to detect whether a person is occupying the seating assembly and, if a person is occupying the seating assembly, to categorize the size of the person into a category;

the seating assembly further comprises a temperature measuring device configured to measure the temperature of the object presented on the external surface of the seating assembly, and wherein the activated temperature altering systems attempt to maintain the temperature of the object;

the vehicle is an autonomous vehicle and the object comprises food;

delivering the object to a destination, removing the object from the vehicle, and deactivating the temperature altering systems that were activated; and the multiple temperature altering systems comprise multiple heating elements concentrically arranged.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
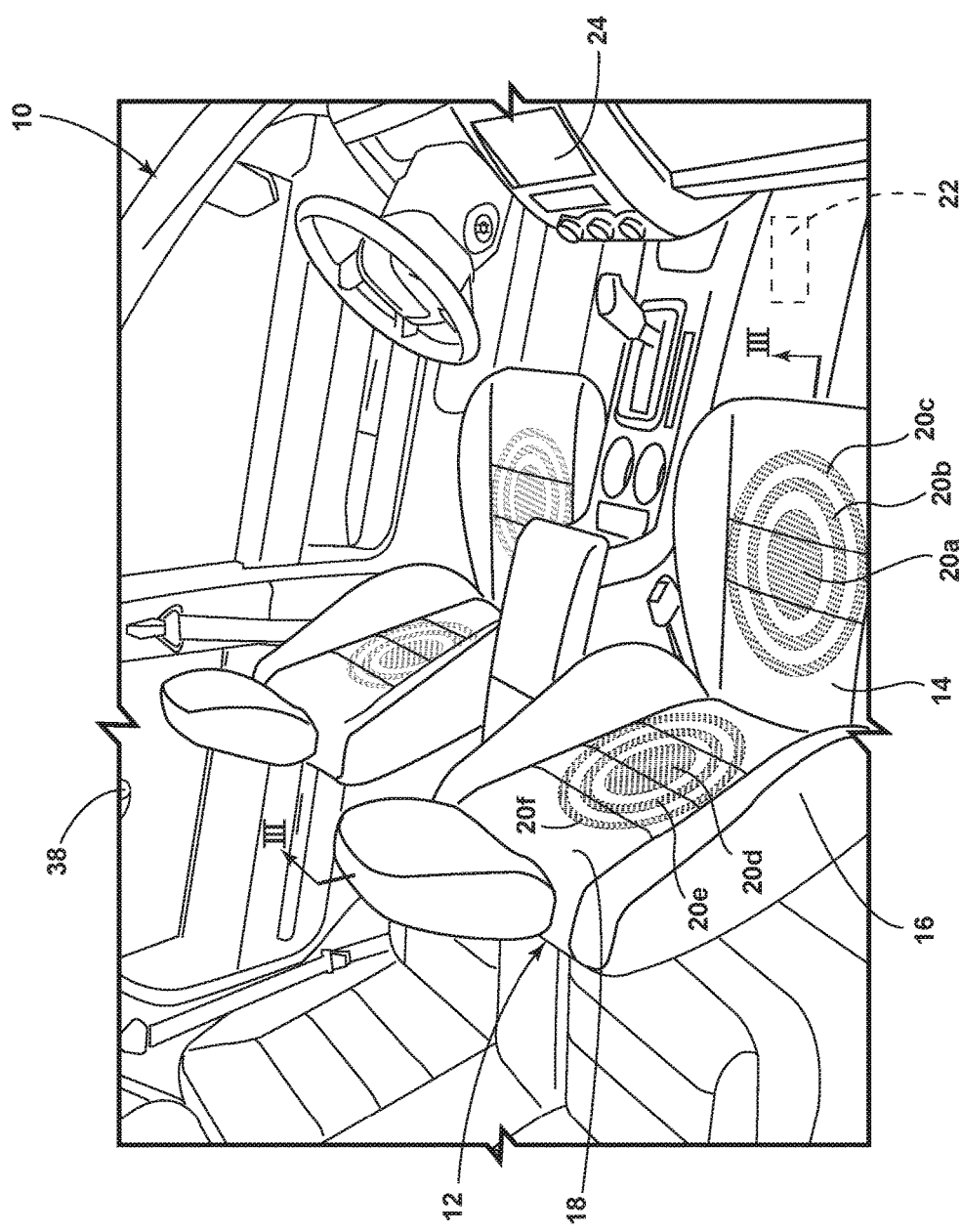
FIG. 1 is a perspective view of the interior of a vehicle including a seating assembly with multiple temperature altering systems disposed within.
Figure 2:
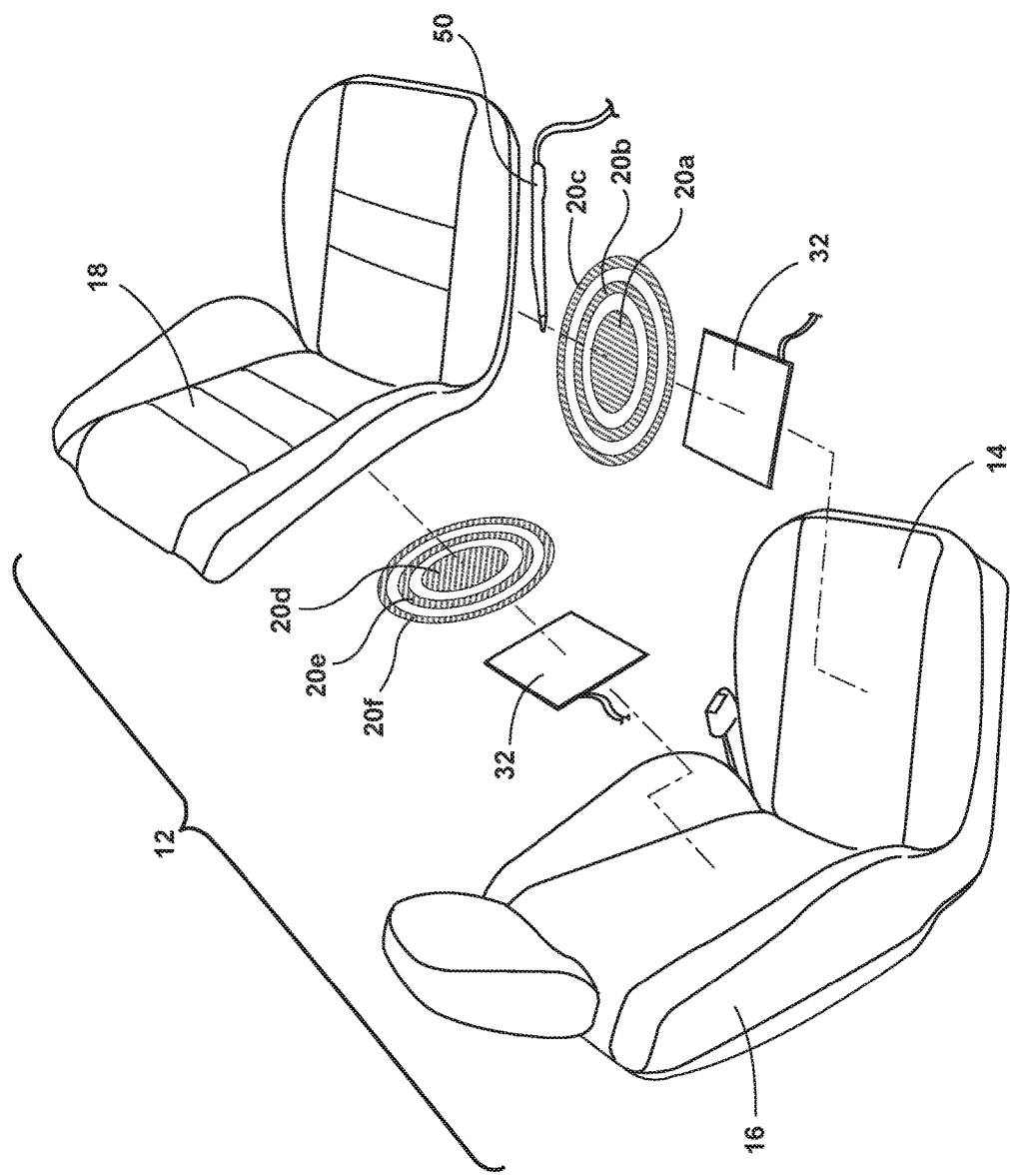
FIG. 2 is a perspective exploded view of the seating assembly of FIG. 1 illustrating multiple temperature altering systems disposed in both the seat and the seatback.
Figure 3:
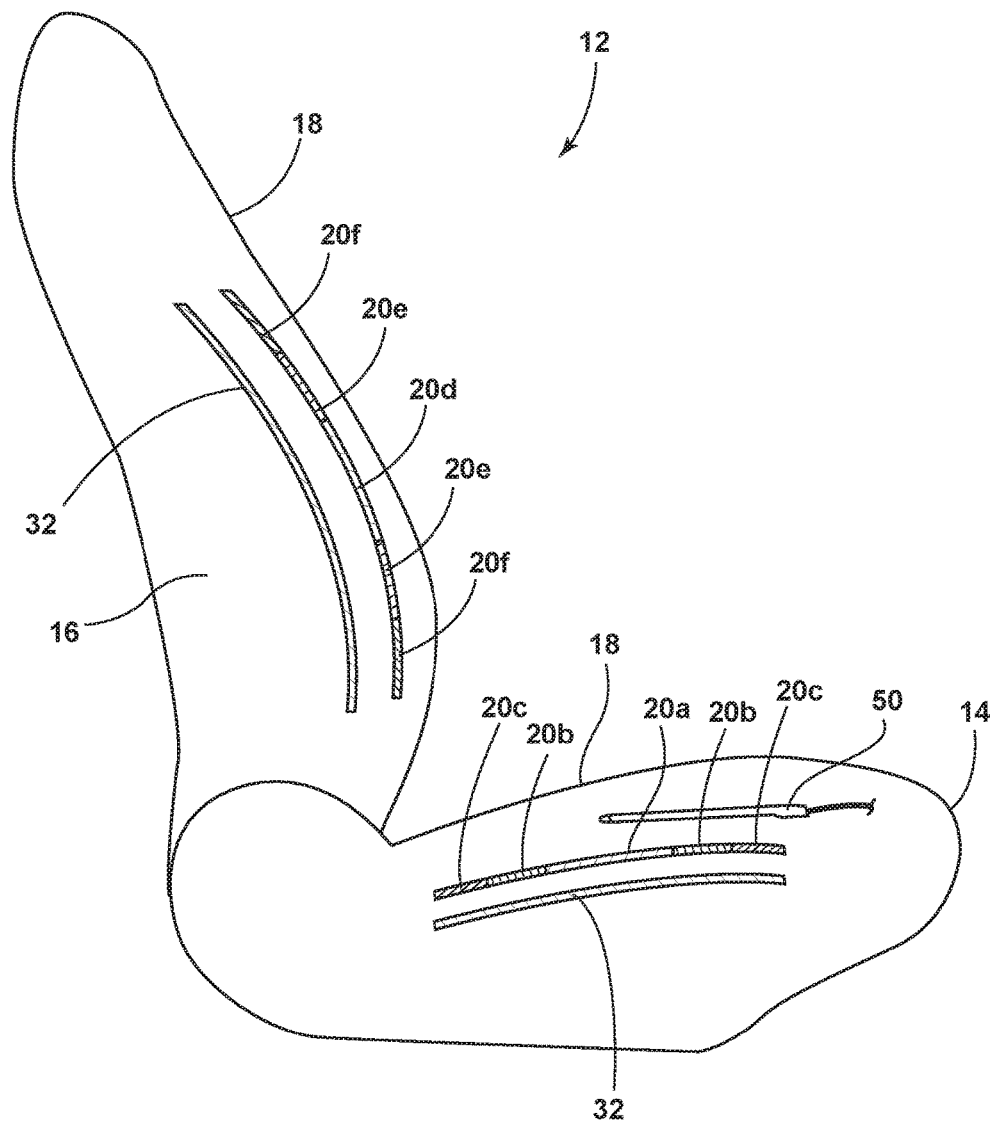
FIG. 3 is a cross-sectional view of the seating assembly taken through line III-III of FIG. 1.
Figure 4:
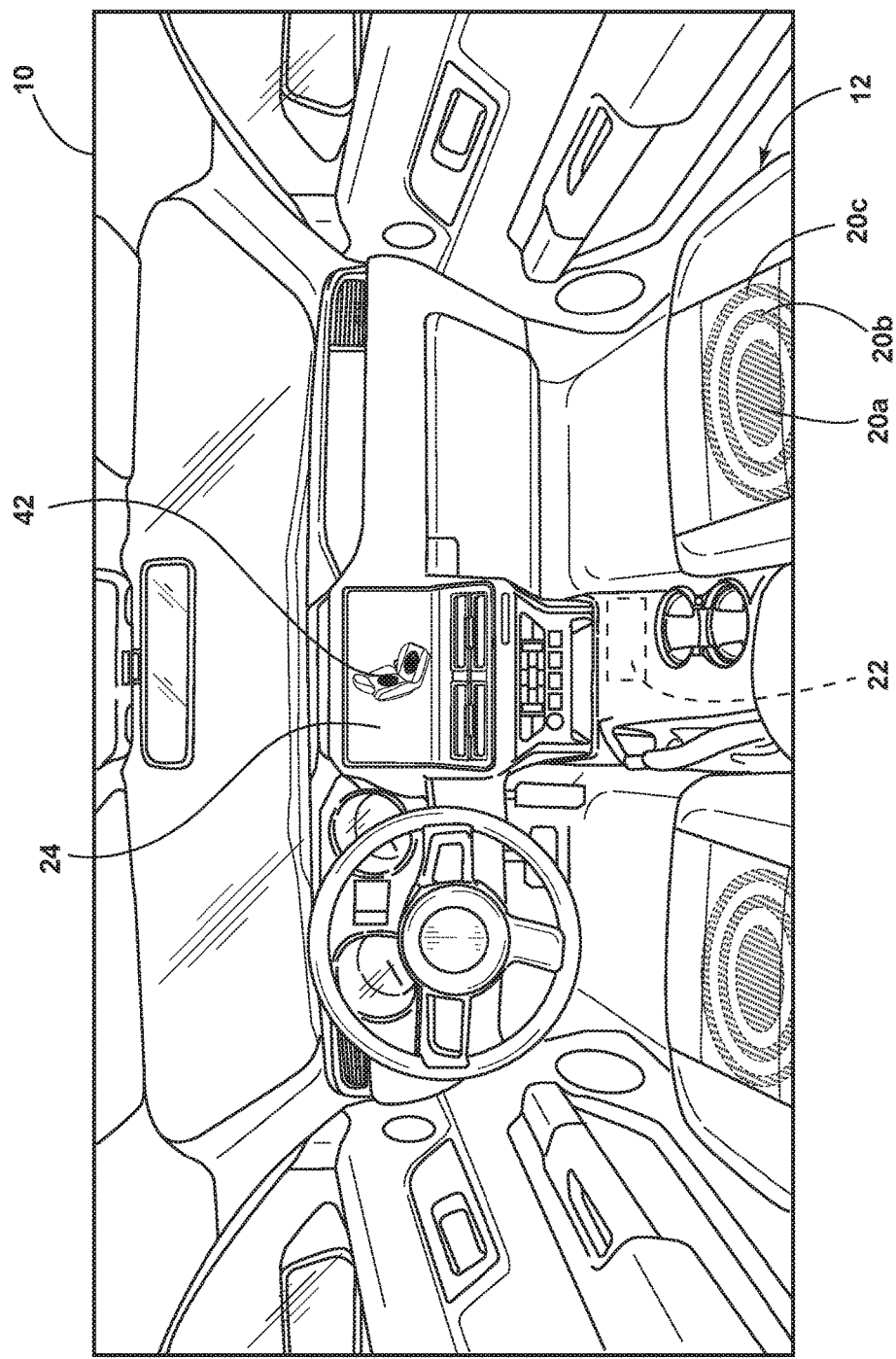
FIG. 4 is a rear perspective view of the interior of the vehicle of FIG. 1, illustrating a user interface to activate one or more of the multiple temperature altering systems.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring generally to FIGS. 1-4, an interior of vehicle 10 is illustrated including a seating assembly 12. The seating assembly 12 includes a seat 14 and a seatback 16. The seat 14 generally supports an occupant sitting on the seat 14, and the seatback 16 generally is configured to support the back and head of the occupant. The vehicle 10 can be a car, truck, or van, among other things. The vehicle 10 can be an autonomous vehicle with a food delivery mode.

The seating assembly 12 has an external surface 18. The external surface 18 is the portion of the seating assembly 12 configured to contact an object during normal use, such as a passenger or operator of the vehicle 10, or inanimate objects like food to be delivered or personal computing devices. Generally, the external surface 18 at the top of the seat 14 and the forward facing part of the seatback 16 are configured to contact an object during normal use. The external surface 18 is typically a fabric such as leather or cloth.

The seating assembly 12 further includes multiple temperature altering systems 20a-f disposed beneath the external surface 18, such as a first temperature altering system 20a, a second temperature altering system 20b, and a third temperature altering system 20c located within the seat 14, and a fourth temperature altering system 20d, a fifth temperature altering system 20e, and a sixth temperature altering system 20f located within the seatback 16. In other words, there are multiple temperature altering systems 20a-c disposed beneath the external surface 18 within the seat 14 and multiple temperature altering systems 20d-f disposed beneath the external surface 18 within the seatback 16. Instead of six multiple temperature altering systems 20a-f, the seating assembly 12 may include more or less than three temperature altering systems (20a, 20b, 20c) within the seat 14 and/or more or less than three temperature altering systems (20d, 20e, 20f) within the seatback 16, as long the seating assembly 12 includes more than one. For example, the seat 14 may contain only one of the multiple temperature altering systems (such as 20a) and the seatback 16 may contain only one of the multiple temperature altering systems (such as 20d). Each of the multiple temperature altering systems 20a-f is associated with altering the temperature of a different area of the external surface 18. In general, each of the multiple temperature altering systems 20a-f will alter the temperature of the nearest area of the external surface 18. Instead of the concentric circle pattern illustrated in the figures, the multiple temperature altering systems 20a-f may be arranged in any manner, such as concentric squares or other concentric polygons. Further, the multiple temperature altering systems 20af can be arranged in zones, such as temperature altering system 20a next to temperature altering system 20b next to temperature altering system 20c in the seat 14, and temperature altering system 20d next to temperature altering system 20e next to temperature altering system 20f in the seatback 16.

The multiple temperature altering systems 20a-f may be heating elements that can increase the temperature at the external surface 18 or maintain the temperature at the external surface 18 above the ambient temperature. An example heating element is a resistance element such as a wire that produces heat while conducting current. For example, the multiple temperature altering systems 20a-c located in the seat 14 may include heat producing resistance wires with the third temperature altering system 20c encircling the second temperature altering system 20b, which encircles the first temperature altering system 20a. Multiple temperature altering systems 20d-f disposed in the seatback 16 can be similarly arranged approximately concentrically.

The multiple temperature altering systems 20a-f may be cooling elements that can decrease the temperature at the external surface 18 or maintain the temperature at the external surface 18 below the ambient temperature. An example cooling element is a refrigeration coil. Thus, the multiple temperature altering systems 20a-f can be heat removing (cooling) refrigeration coils with the third temperature altering system 20c partially encircling the second temperature altering system 20b, which partially encircles the first temperature altering system 20a, within the seat 14, and temperature altering system 20f partially encircling temperature altering system 20e, which partially encircles temperature altering system 20d in the seatback 16. As mentioned above, other embodiments may utilize less than three of the multiple temperature altering systems 20a-c within the seat 14 and less than three of the multiple temperature altering systems 20d-f in the seatback 16.

The multiple temperature altering systems 20a-f may be combined heating/cooling devices. For example, the multiple temperature altering systems 20a-f may include thermoelectric heat pumps that use the Peltier effect to produce heat on one side of the device and cool (reduce heat) on the other side of the device. The thermoelectric heat pump can switch which side of the heat pump produces heat or removes heat (cools) by changing the direction of the current leading to the heat pump. Accordingly, the third temperature altering system 20c could be an array of thermoelectric heat pumps encircling or partially surrounding the second temperature altering system 20b, which could be an array of thermoelectric heat pumps encircling or otherwise at least partially surrounding the first temperature altering system 20a, which could be an individual thermoelectric heat pump. In this manner, the first temperature altering system 20a (an individual thermoelectric heat pump) can be individually activated to alter the temperature at one portion of the external surface 18, while the second temperature altering system 20b (the array of thermoelectric heat pumps at least partially surrounding the first temperature altering system 20a) can be additionally activated to alter the temperature at a larger portion of the external surface 18, and so on. Multiple temperature altering systems 20d-f could be similarly arranged in the seatback 16.

The seating assembly 12 of the vehicle 10 further includes a temperature measuring device 50, such as a thermocouple. The temperature measuring device 50 is within the seat 14 portion of the seating assembly 12. The temperature measuring device 50 is configured to measure the temperature of an object presented on the external surface 18 of the seating assembly 12, such as being under but near the external surface 18. The temperature measuring device 50 is in communication with a controller 22 (discussed more fully below).

The seating assembly 12 of the vehicle 10 further includes sensors 32. The sensors 32 are in communication with the controller 22 and used as part of an occupant classification system (discussed fully below) that detects whether a person is occupying the seating assembly 12 and, if a person is occupying the seating assembly 12, categorizes the size of the person into a category. The sensors 32 can be pressure-sensitive sensors, including bladder sensors, capacitive sensors, among other types of sensors. Vehicle regulations sometimes require vehicles to utilize an occupant classification system to categorize the size of the person into a category for purposes of air-bag deployment.

The vehicle 10 further includes a camera 38, which is in communication with the controller 22. Instead of, or in addition to, using sensors 32 within the seating assembly 12 to detect and to classify an occupant, the occupant classification system can utilize the camera 38 to detect whether a person is occupying the seating assembly 12 and, if the person is occupying the seating assembly 12, to categorize the size of the person into a category. The camera 38 can be used to detect and to classify an occupant by comparing an image of an empty seating assembly 12 to an image of an occupant occupying the seating assembly 12. The camera 38 can be used to detect the position of an occupant of the seating assembly 12 by comparing the boundary of the occupant to the boundary of the seating assembly 12. As the occupant changes position on the seating assembly 12, the comparison of the boundary of the occupant to the boundary of the seating assembly 12 will change. A camera 38 may be advantageously utilized in situations when a seating assembly 12 does not include sensors 32 for occupant classification system purposes. For example, larger vehicles with a third row of seating may not include sensors 32 as part of the seating assembly 12 for that third row. Thus, the camera 38 could be utilized instead for occupant classification system purposes.

The interior of the vehicle 10 further includes a user interface 24. The user interface 24 is in communication with the controller 22.

Figure 5:
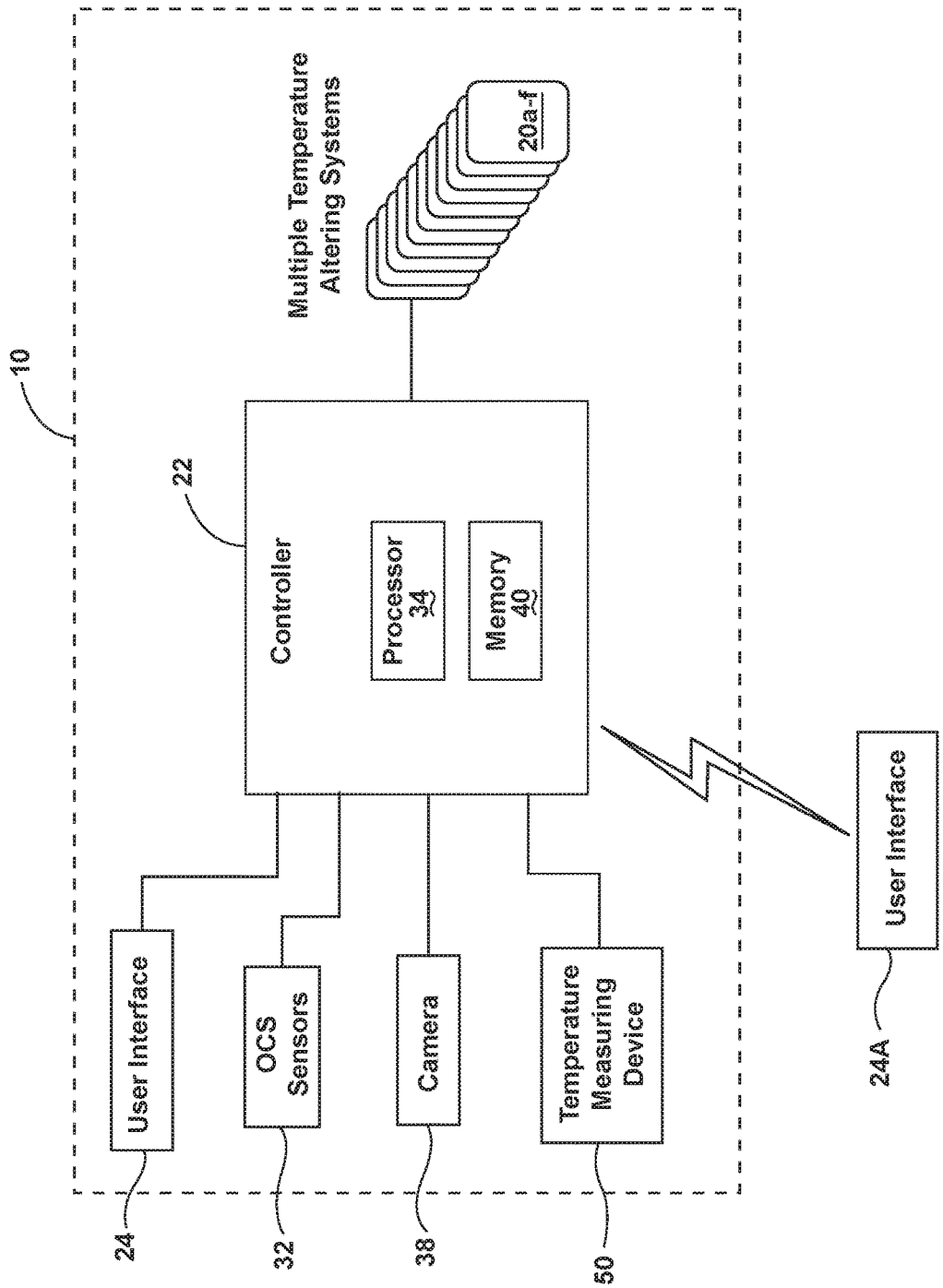
FIG. 5 is a diagram illustrating the various inputs that a controller uses to controls the multiple temperature altering systems in the seating assembly of FIG. 1.

Referring now to FIG. 5, the controller 22 separately controls each of the multiple temperature altering systems 20a-f. The controller 22 individually controls (such as activates or deactivates) each of the multiple temperature altering systems 20a-f. The controller 22 may include a processor 34 and memory 40. The processor 34 may correspond to one or more circuits configured to receive signals and information from a variety of vehicle systems and peripherals. The processor 34 may correspond to one or more microprocessors, circuits, application specific integrated circuits (ASIC), and/or related processing devices. The processor 34 may be in communication with memory 40. The memory 40 may correspond to random access memory (RAM), read only memory (ROM), magnetic disc storage media, optical storage media, flash memory devices, etc. In various embodiments, the memory 40 may be configured to store machine readable information or routines to enable various processes and methods disclosed herein.

The controller 22 can use the input provided from the user interface 24 to control each of the multiple temperature altering systems 20a-f. The user interface 24 allows a user to select which of the multiple temperature altering systems 20a-f to activate. For example, the user interface 24 could be provided within the vehicle 10 and could be a touch screen allowing the user to select which of the multiple temperature altering systems 20a-f to activate by touching a graphical representation 42 associated with each of the multiple temperature altering systems 20a-f. Alternatively, the user interface 24 could be a voice activated control, a series of switches or dials, among other things.

The controller 22 can separately control each of the multiple temperature altering systems 20a-c located in the seat 14, as a function of the information that the temperature measuring device 50 sends to the controller 22. In one embodiment, an object is presented on the seat 14. The temperature measuring device 50 measures the temperature of the object. The temperature measuring device 50 sends the measured temperature data to the controller 22. The controller 22 is tasked with controlling multiple temperature altering systems 20a-c such that the temperature of the object remains at the initial measured temperature. The temperature measuring device 50 continues to monitor the temperature of the object and feeds this data to the controller 22, which controls the multiple temperature altering systems 20a-c accordingly. This is useful, as mentioned above, if the vehicle 10 is an autonomous vehicle that is tasked for food delivery.

Figure 6:
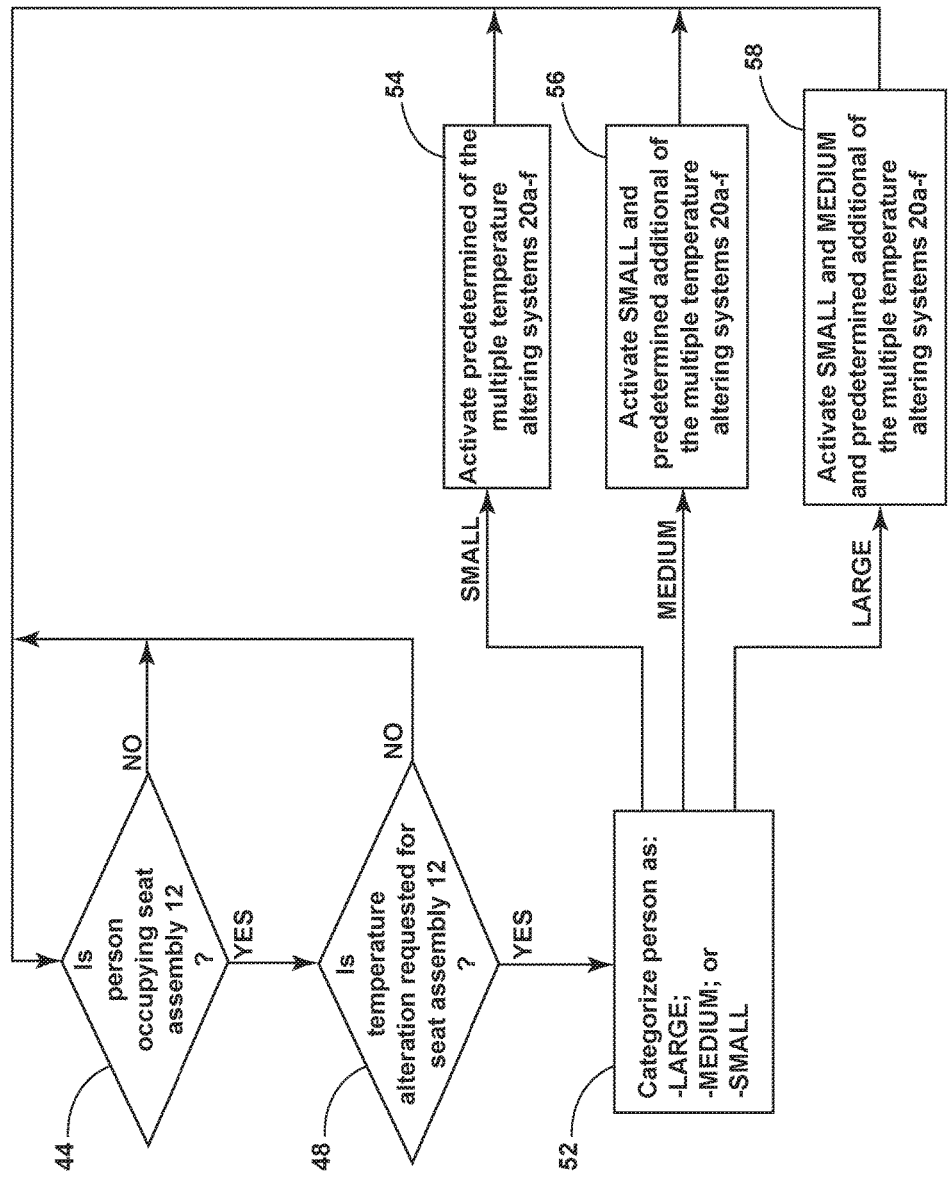
FIG. 6 is a decision tree for an embodiment of a method of altering the temperature of an external surface of the seating assembly of FIG. 1.

Referring now also to FIG. 6, the controller 22 can separately control each of the multiple temperature altering systems 20a-f, as a function of the information that the sensors 32 and/or camera 38 provide, in association with the occupant classification system. More specifically, the controller 22 takes input provided by the sensors 32 or camera 38 to first determine whether a person is occupying the seating assembly 12. If the controller 22 determines that a person is occupying the seating assembly 12, then the controller 22 categorizes the person occupying the seating assembly as LARGE, MEDIUM, or SMALL (accordingly to occupant classification system criteria), again based on the input provided by sensors 32 or camera 38. The person occupying the seating assembly 12 may then attempt to alter the temperature of the seating assembly 12. Based on the category of the size of the occupant of the seating assembly 12, the controller 22 can selectively activate only those of the multiple temperature altering systems 20a-f that will alter the temperature of the portion of the external surface 18 that assumed to be in contact with the categorized person.

More specifically, at step 44, the controller 22 first determines, based on data provided by sensors 32 or camera 38, whether a person is occupying the seating assembly 12. If the determination is NO, then the process returns to the beginning. If the determination is YES, then at step 48 the controller 22 determines whether temperature alteration is requested for the seating assembly 12 (such as the seat occupant attempting to warm or cool the seating assembly 12). If the determination is NO, then the process returns to the beginning. If the determination is YES, then at step 52 the controller 22 categorizes the person based on the data provide by sensors 32 or camera 38 into one of the categories of LARGE, MEDIUM, or SMALL, accordingly to occupant classification system criteria. If the categorization is SMALL, then at step 54 the controller 22 activates certain predetermined temperature altering systems of the multiple temperature altering systems 20a-f and the process returns to the beginning. If the categorization is MEDIUM, then at step 56 the controller 22 activates those temperature altering systems of the multiple temperature altering systems 20a-f that would have been activated if the categorization was SMALL and certain additional predetermined temperature altering systems of the multiple temperature altering systems 20a-f and the process returns to the beginning. If the categorization is LARGE, then at step 58 the controller 22 activates those temperature altering systems of the multiple temperature altering systems 20a-f that would have been activated if the categorization was MEDIUM (including SMALL) and certain additional predetermined temperature altering systems of the multiple temperature altering systems 20a-f and the process returns to the beginning.

Which of the multiple temperature altering systems 20a-f are activated for any specific category (SMALL, MEDIUM, or LARGE) is predetermined. For example, if the categorization of the occupant is SMALL, it may be predetermined that multiple temperature altering systems 20a and 20d are activated, based on the assumption that multiple temperature altering systems 20a and 20d would alter the portion of the seating assembly 12 with which the occupant is in contact and multiple temperature altering systems 20b, 20c, 20e, and 20f would not. If the categorization of the occupant is MEDIUM, it may be predetermined that multiple temperature altering systems 20a, 20b, 20d, and 20e are activated, based on the same assumption. If the categorization of the occupant is LARGE, it may be predetermined that all of the multiple temperature altering systems 20a-f are activated, based on the same assumption.

In addition, the controller 22 can determine which of the temperature altering systems 20a-f to activate depending on the data provided by camera 38 in terms of the position of the person on the seating assembly 12. The controller 22 can compare the boundary of the person to the boundary of the seating assembly 12 and determine which of the multiple temperature altering systems 20a-f are in thermal communication with the external surface 18 of the seating assembly 12 with which the person is in contact. The controller 22 will not activate the temperature altering systems of the multiple temperature altering systems 20a-f that are in thermal communication with portions of the external surface 18 with which the person is not in contact with. The controller 22 can then activate only those of the multiple temperature altering systems 20a-f that are in thermal communication with portions of the external surface 18 with which the person is in sufficient contact. For example, a person is sitting on the seating assembly 12, but is positioned to one side, such that the person is in contact with portions of the external surface 18 in thermal communication with temperature altering systems 20a, b, d, e but not temperature altering systems 20c, f of the multiple temperature altering systems 20a-f. The camera 38 provides an image. The controller 22 compares the boundary of the person to the boundary of the seating assembly. The controller 22 determines based on the boundary comparison that the person is in contact with portions of the external surface 18 in thermal communication with temperature altering systems 20a, b, d, e but not temperature altering systems 20c, f of the multiple temperature altering systems 20a-f. The controller 22 then activates only temperature altering systems 20a, b, d, e but not temperature altering systems 20c, f of the multiple temperature altering systems 20a-f.

Figure 7:
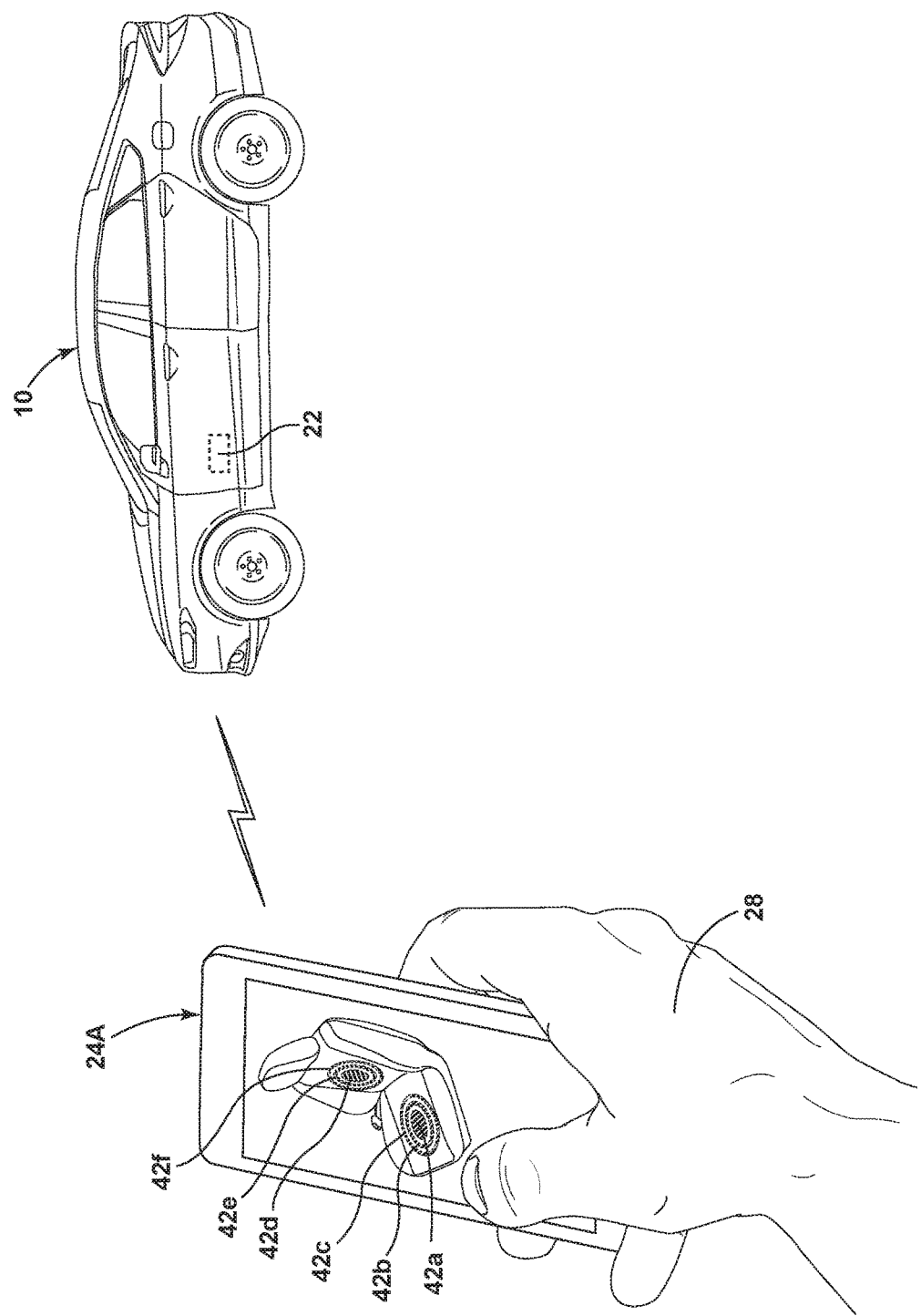
FIG. 7 is a perspective view of a user using a user interface outside of the vehicle of FIG. 1 to control the multiple temperature altering systems.

Referring now to FIG. 7, in addition to, or as an alternative to the user interface 24 provided within a vehicle 10, a user interface 24A can be located outside of the vehicle 10. The user interface 24A can be a mobile computing device, such as a smart phone, and a user 28 can select which of the multiple temperature altering systems 20a-f to activate via the user interface 24A. The user interface 24A is in communication with the controller 22 located within the vehicle 10, such as via a radio wave transmitting and receiving system (e.g., Bluetooth®) or via a mobile communications system. The user 28 could activate one or more of the multiple temperature altering systems 20a-f by touching on a touch screen presented on the user interface 24A a graphical representation 42a-f of the desired multiple temperature altering systems 20a-f. For example, the user 28 could touch graphical representations 42d and 42e to activate multiple temperature altering systems 20d and 20e. The user interface 24A transmits the selection to the controller 22, which would then activate temperature altering systems 20d and 20e.

Figure 8:
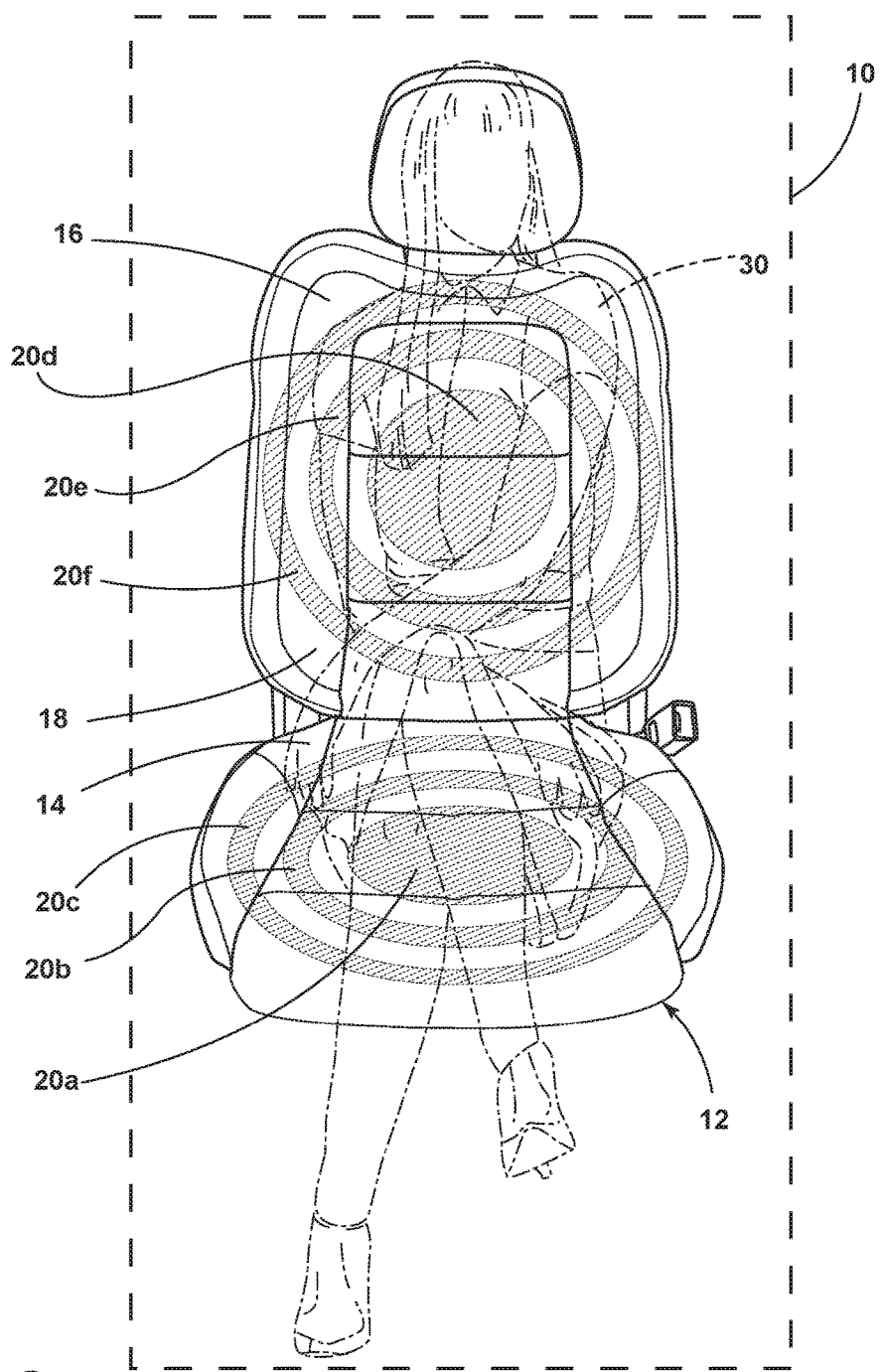
FIG. 8 is a front view of a person sitting on the seating assembly of FIG. 1.
Figure 9:
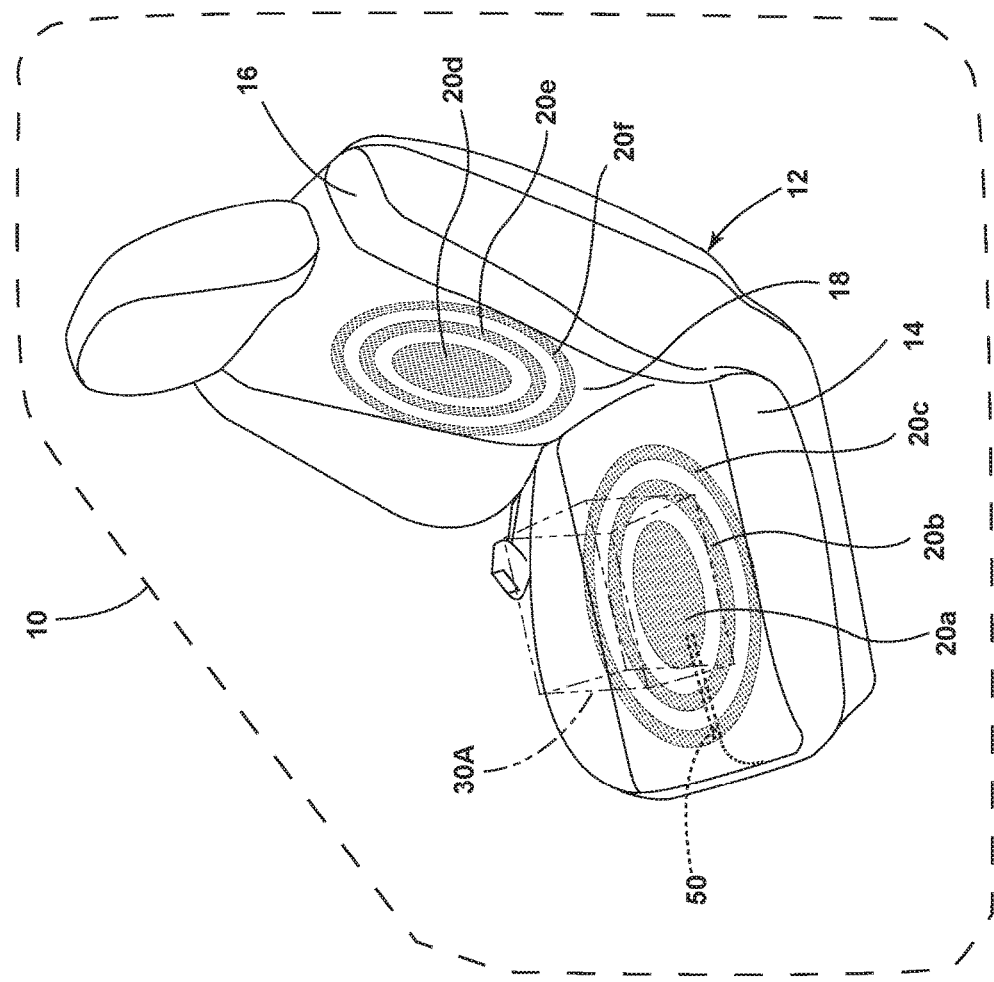
FIG. 9 is a side perspective view of an object presented on the seating assembly of FIG. 1.

Referring now additionally to FIGS. 8 and 9, a novel method of altering the temperature of the external surface 18 of the seating assembly 12 is disclosed herein. The method includes providing the seating assembly 12 for the vehicle 10. The seating assembly 12 for the vehicle 10 includes an external surface 18 and multiple temperature altering systems 20a-f disposed beneath the external surface 18 and in thermal communication therewith. The method further includes presenting an object 30 (such as a person) having a size on the external surface 18 of the seating assembly 12. The method further includes determining which of the multiple temperature altering systems 20a-f to activate as a function of the size of the object 30 and the position of the object 30 on the seating assembly 12, such that only the temperature altering systems of the multiple temperature altering systems 20a-f disposed near the portions of the external surface 18 upon which the object 30 is presented upon are to be activated and are activated. In the hypothetical example illustrated in FIG. 8, it would be determined that only the first temperature altering system 20a and the fourth temperature altering system 20d should be activated but not temperature altering systems 20b, 20c, 20e, and 20f. That determination is made because the temperature altering systems 20a and 20d will efficiently alter the temperature of the object 30 through the external surface 18 upon which the object 30 is presented, while the remaining temperature altering systems 20b, 20c, 20e, and 20f will not. Those remaining temperature altering systems 20b, 20c, 20e, and 20f, if activated, would alter significant portions of the external surface 18 with which the object 30 is not in contact, resulting in wasted energy. The method further comprises activating only the temperature altering systems of the multiple temperature altering systems 20a-f that the method determined to activate as a function of the size of the object 30 and the position of the object 30 on the seating assembly 12. Thus, in the example of FIG. 8, only the temperature altering systems 20a and 20d of the multiple temperature altering systems 20 are activated.

The method can further comprise providing a user interface 24 that allows a user 28 to select which of the multiple temperature altering systems 20a-f to activate. In which case, the act of activating only the temperature altering systems of the multiple temperature altering systems 20a-f that the method determined to activate as a function of the size of the object 30 and the position of the object 30 on the seating assembly 12 can comprise selecting, via the user interface 24, which of the temperature altering systems 20a-f to activate. Thus, in the example of FIG. 8, the user 28 can then use the user interface 24 provided within the vehicle 10 to activate only temperature altering systems 20a and 20d of the multiple temperature altering systems 20a-f to alter the temperature of the object 30. As another hypothetical example, in reference to FIG. 9, the user 28 might have left an object 30A (such as a laptop computer) unattended within the vehicle 10 on the portion of the external surface 18 above temperature altering system 20a and 20b, and the ambient temperature could be higher than desired for the object 30A. In such a circumstance, the user 28 could use the user interface 24A outside of the vehicle 10 to remotely activate only temperature altering systems 20a and 20b of the multiple temperature altering systems 20a-f, by pressing the associated graphical representations 42a and 42b (see FIG. 6), to provide cooling to the object 30A presented on the external surface 18. Activating all of the multiple temperature altering systems 20a-f would have been inefficient, because temperature altering systems 20c-20f would expend energy altering the temperature associated with portions of the external surface 18 on which the object 30A was not presented.

As mentioned, in this novel method, the object 30 can be a person. The vehicle 10 can include an occupant classification system, as discussed above, that detects whether a person is occupying the seating assembly 12 and, if a person is occupying the seating assembly 12, categorizes the size of the person into a category (SMALL, MEDIUM, or LARGE). As discussed above, the occupant classification system utilizes sensors 32 within the seating assembly 12 or the camera 38 to detect whether a person is occupying the seating assembly 12, and then categorize the size of the person into the category of SMALL, MEDIUM, or LARGE, based on occupant classification system criteria. The step of determining which of the multiple temperature altering systems 20a-f to activate as a function of the size of the object 30 and the position of the object 30 on the seating assembly 12 thus comprises determining which of the multiple temperature altering systems 20a-f to activate as a function of the category of the size of the person categorized by the occupant classification system. Certain predetermined temperature altering systems of the multiple temperature altering systems 20a-f will be activated if the category of the size of the person is SMALL, additional predetermined temperature altering systems of the multiple temperature altering systems 20a-f will be activated if the category of the size of the person is MEDIUM, and yet additional predetermined temperature altering systems of the multiple temperature altering systems 20a-f will be activated if the category of the size of the person is LARGE, as explained above. In the hypothetical example associated with FIG. 8, the controller 22 using occupant classification system criteria categorizes the size of the object 30 (person) into the category of SMALL. Accordingly, the controller 22 determines, based on this categorization of SMALL and the predetermination that temperature altering systems 20a and 20d would be activated for the category of SMALL, that the temperature altering systems 20a and 20d of the multiple temperature altering systems 20a-f were to be activated. Only the temperature altering systems 20a and 20d are subsequently activated. Activating only temperature altering systems 20a and 20d, as opposed to all six of the temperature altering systems 20a-f, results in energy efficiency, because activating temperature altering systems 20a and 20d is sufficient to alter the temperature of the portion of the external surface 18 upon which the object 30 (person categorized as SMALL) is presented. The remaining temperature altering systems 20b, 20c, 20e, and 20f of the multiple temperature altering systems 20a-f should not be activated because those temperature altering systems alter the temperature of portions of the external surface 18 upon which the object 30 is not presented. If the object 30 (here, a person) were larger, the occupant classification system could have classified the object 30 as MEDIUM or LARGE. In which case, the controller 22 determined, based on the categorization of MEDIUM or LARGE and the predetermination of which of the multiple temperature altering systems would be activated for such categorizations, that temperature altering systems in addition to the temperature altering systems 20a and 20d of the multiple temperature altering systems 20a-f were to be activated.

As another aspect of this novel method, as mentioned above, the seating assembly 12 further comprises the temperature measuring device 50 that is configured to measure the temperature of the object 30 presented on the external surface 18 of the seating assembly 12. In such a case, the activated temperature altering systems of the multiple temperature altering systems 20a-f can attempt to maintain the measured temperature of the object 30. Referring now to FIG. 9, as another hypothetical example, the seating assembly 12 includes the multiple temperature altering systems 20a-f. An object 30A (such as a large carton of ice cream) is presented on the external surface 18 of the seating assembly 12. The temperature measuring device 50 measures the temperature of the object 30A presented. To prevent the object 30A (e.g., ice cream) from altering temperature (e.g., melting), it would be advantageous for one or more of the multiple temperature altering systems 20a-f to attempt to maintain the temperature of the object 30A presented at the measured temperature. It can then be determined which of the multiple temperature altering systems 20 of these multiple temperature altering systems 20 to activate accordingly as a function of the size of the object 30A and the position of the object 30A on the seating assembly 12. Here, in this example, to most efficiently maintain the measured temperature of the object 30A at its measured temperature, only temperature altering systems 20a and 20b of the multiple temperature altering systems 20 should be activated. The object 30A does not contact the portion of the external surface 18 in direct thermal communication with the remaining temperature altering systems 20c-20f of the multiple temperature altering systems 20a-f. Thus, activating those particular temperature altering systems 20c-20f would not be energy efficient. The temperature altering systems 20a and 20b are thus activated and those activated temperature altering systems 20a and 20b attempt to maintain the temperature of the object 30A at the measured temperature. The vehicle 10 used in performance of this method can be an autonomous vehicle. This novel method can thus further comprise delivering the object 30A (e.g., food) to a destination, removing the object 30A from the vehicle 10, and deactivating the temperature altering systems (e.g., 20a and 20b) of the multiple temperature altering systems 20a-f that were activated.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A seating assembly for a vehicle comprising:
an external surface and multiple temperature altering systems disposed beneath the external surface;
at least one sensor associated with the seating assembly; and
a controller in communication with the least one sensor and the multiple temperature altering systems,
wherein, when an object having a size is placed on the external surface of the seating assembly and the temperature of the external surface of the seating assembly is to be altered, the controller determines, based on information provided by the at least one sensor, which of the multiple temperature altering systems to activate as a function of the size of the object, such that, the larger the size of the object, the more of the multiple temperature altering systems the controller will activate, and the controller then activates those temperature altering systems.

2. The seating assembly of claim 1,
wherein, each of the multiple temperature altering systems is associated with altering the temperature of a different area of the external surface; and
wherein, the controller activates only the temperature altering systems of the multiple temperature altering systems that are associated with altering the temperature of the areas of the external surface that contact the object.

3. The seating assembly of claim 2, wherein the temperature altering system or systems that the controller activates uses the Peltier effect to selectively heat or cool the external surface.

4. The seating assembly of claim 2,
wherein, the at least one sensor includes a camera; and
wherein, the controller utilizes data from the camera to compare a boundary of the object to a boundary of the seating assembly and to determine which of the multiple temperature altering systems are associated with the areas of the external surface with which the object is in contact.

5. The seating assembly of claim 1,
wherein, the object is a person; and
wherein, the controller determining which of the multiple temperature altering systems to activate as a function of the size of the person includes categorizing the size of the person into one of several predetermined categories of size, and each of the predetermined categories of size is associated with activation of predetermined temperature altering systems of the multiple temperature altering systems.

6. The seating assembly of claim 5,
wherein, the predetermined categories of size include at least three categories; and
wherein, the category of size representing the smallest size of the at least three categories is associated with predetermined temperature altering systems of the multiple temperature altering systems;
wherein, the category of size representing the largest size of the at least three categories is associated with more predetermined temperature altering systems of the multiple temperature altering systems than the number of temperature altering systems associated with the smallest size of the at least three categories; and
wherein, the category of size representing a size between the smallest size and the largest size is associated with more predetermined temperature altering systems of the multiple temperature altering systems than the number of temperature altering systems associated with the smallest size of the at least three categories but less predetermined temperature altering systems of the multiple temperature altering systems than the number of temperature altering systems associated with the largest size of the at least three categories.

7. The seating assembly of claim 1 further comprising a temperature measuring device in communication with the controller that is configured to measure the temperature of the object presented on the external surface of the seating assembly;
wherein, the controller controls the activated temperature altering systems to maintain the temperature of the object at the temperature measured by the temperature measuring device.

8. The seating assembly of claim 7, wherein the vehicle is an autonomous vehicle and the object comprises food.

9. The seating assembly of claim 8,
wherein, the vehicle is tasked to deliver the object to a destination, and when the object is removed from the vehicle, the controller deactivates the temperature altering systems that the controller had activated.

10. The seating assembly of claim 1, wherein the multiple temperature altering systems comprise multiple heating elements concentrically arranged.

11. A seating assembly for a vehicle comprising:
a seatback, a seat, and an external surface covering at least portions of both the seatback and the seat;
multiple temperature altering systems disposed beneath the external surface within the seat;
multiple temperature altering systems disposed beneath the external surface within the seatback, each of the multiple temperature altering systems associated with altering the temperature of a different area of the external surface;

at least one sensor used to detect whether a person is occupying the seating assembly and, if a person is occupying the seating assembly, to categorize the size of the person into a category; and a controller in communication with the at least one sensor and independently controlling each of the multiple temperature altering systems;

wherein, the controller determines from input provided by the at least one sensor whether a person is occupying the seating assembly and, if so, categorizes the size of the person into a category; and wherein, the controller activates predetermined temperature altering systems of the multiple temperature altering systems as a function of the category of the size of the person, such that the larger the size of the person, the more temperature altering systems of the multiple temperature altering systems are activated.

12. The seating assembly of claim 11, wherein, the at least one sensor is utilized as part of an occupant classification system that categorizes size of the person for purposes of air-bag deployment.

13. The seating assembly of claim 11, wherein the at least one sensor is disposed beneath the external surface.

14. The seating assembly of claim 11, wherein the multiple temperature altering systems of the seat and the seatback are concentrically arranged.

15. The seating assembly of claim 11, wherein the at least one sensor includes a camera.

16. A vehicle comprising:
a seating assembly comprising an external surface and multiple temperature altering systems disposed beneath the external surface each associated with altering the temperature of a different area of the external surface;
a temperature measuring device configured to measure the temperature of an object placed on the external surface of the seating assembly; and
a controller in communication with the temperature measuring device and the multiple temperature altering systems that separately controls each of the multiple temperature altering systems and causes one or more of the multiple temperature altering systems to maintain the object at the measured temperature.

17. The vehicle of claim 16, the controller activating only the temperature altering systems of the multiple temperature altering systems that are disposed under the areas of the external surface upon which the object is placed.

18. The vehicle of claim 17, wherein the controller utilizes input from a mobile computing device user interface to activate only the temperature altering systems of the multiple temperature altering systems that are disposed under the areas of the external surface upon which the object is placed.

19. The vehicle of claim 16, wherein, the object includes food and the vehicle is an autonomous vehicle tasked for delivery of the food.

* * * * *